United States Patent
Lee et al.

(10) Patent No.: US 10,761,560 B2
(45) Date of Patent: Sep. 1, 2020

(54) METHOD AND APPARATUS FOR TRANSACTION BASED PROPAGATED CLOCK-GATING FOR LOW POWER DESIGN

(71) Applicants: Chang Hoon Lee, Montreal (CA); John Edward Vincent, Ottawa (CA); Louis-Philippe Hamelin, Montreal (CA); Paul Alepin, Montréal (CA)

(72) Inventors: Chang Hoon Lee, Montreal (CA); John Edward Vincent, Ottawa (CA); Louis-Philippe Hamelin, Montreal (CA); Paul Alepin, Montréal (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/160,075

(22) Filed: Oct. 15, 2018

(65) Prior Publication Data

US 2020/0117231 A1    Apr. 16, 2020

(51) Int. Cl.
| | |
|---|---|
| *G06F 1/10* | (2006.01) |
| *H03K 5/135* | (2006.01) |
| *G06F 30/327* | (2020.01) |
| *G06F 119/06* | (2020.01) |
| *G06F 119/12* | (2020.01) |

(52) U.S. Cl.
CPC .............. *G06F 1/10* (2013.01); *G06F 30/327* (2020.01); *H03K 5/135* (2013.01); *G06F 2119/06* (2020.01); *G06F 2119/12* (2020.01)

(58) Field of Classification Search
CPC ...... G06F 1/10; G06F 17/505; G06F 2217/78; G06F 2217/84; H03K 5/135
See application file for complete search history.

(56) References Cited

U.S. PATENT DOCUMENTS

| | | | |
|---|---|---|---|
| 5,983,339 A | 11/1999 | Klim | |
| 8,130,019 B1 | 3/2012 | Awad et al. | |
| 2010/0001777 A1* | 1/2010 | Brantley | H03K 5/135 327/261 |
| 2016/0350259 A1 | 12/2016 | Jeon et al. | |

FOREIGN PATENT DOCUMENTS

WO    9630819 A1    10/1996

* cited by examiner

*Primary Examiner* — Lincoln D Donovan
*Assistant Examiner* — Colleen J O Toole

(57) ABSTRACT

The embodiments employ a transaction based design methodology to supply clocking when clock pulses are requested. The transactional module receives a clock when it requests a clock pulse and one stage of a logic pipeline is clocked at a time. This methodology reduces dynamic power dissipation by the transactional module from the dynamic power dissipated by traditional synchronous logic designs.

12 Claims, 4 Drawing Sheets

METHOD AND APPARATUS FOR TRANSACTION BASED PROPAGATED CLOCK-GATING FOR LOW POWER DESIGN

FIELD OF THE INVENTION

The present invention pertains to the field of digital logic design, and in particular to reduced dynamic power digital logic design.

BACKGROUND

Integrated circuit (IC) design tools are designed for synchronous designs, and therefore, asynchronous designs must be constrained in IC design tools using synchronous constructs. As a result, the asynchronous design cycle using traditional design methodologies is typically longer than the synchronous design cycle.

Digital logic designs are composed of a plurality of pipeline stages that are clocked synchronously. Many digital logic designs only require a small percentage of pipeline stages to be clocked as the logic in these stages process information. However, current design methodologies using current design tools produce designs that clock more pipeline stages (for example flip-flops) in a logic design than necessary. Accordingly, there exists a need for solutions which improve over the state of the art.

This background information is intended to provide information that may be of possible relevance to the present invention. No admission is necessarily intended, nor should be construed, that any of the preceding information constitutes prior art against the present invention.

SUMMARY

An aspect of this disclosure provides a clock control block (CCB). The CCB includes a system clock, an input configured to receive a clock request, and a plurality of stages. The plurality of stages each output a single clock pulse in response to the receipt of the clock request and the system clock. In some embodiments the clock request includes a transition. In some embodiments each of the plurality of stages outputs the single clock pulse having a clock transition dependant on the period of the system clock and the transition of the clock request. In some embodiments the transition of the clock request includes a rising edge, a falling edge, a rising edge followed by falling edge, or a falling edge followed by a rising edge. In some embodiments the CCB's input is configured to receive the clock request in the form of a series of clock requests and each of the plurality of stages outputs an output series of single clock pulses, with the timing of the output series in response to the receipt of the system clock and the series of clock requests. In some embodiments the system clock generates a system clock signal having a first clock period having a first rising edge followed by a first falling edge followed by a second rising edge. The plurality of stages in this embodiment includes first, second and third stages configured such that the first stage outputs a single clock pulse at the first rising edge, the second stage outputs a single clock pulse at the first falling edge, and the third stage outputs a single clock pulse at the second rising edge. In some embodiments each of the plurality of stages outputs the single clock pulse at a multiple of the clock period. In some embodiments successive stages of the plurality of stages outputs a single pulse at successive edges of the system clock signal. In some embodiments the CCB further includes a second input for receiving a second clock request, where at least one stage of the plurality of stages outputs the single clock pulse dependant on the system clock and both the clock request and the second clock request. In some embodiments the system clock has a first clock period and the clock request is a clock request signal having a second clock period different that the first clock period. In some embodiments each of the plurality of stages outputs a series of clock pulses having transitions dependant on the first clock period and the second clock period. In some embodiments the CCB's input is configured to receive clock requests from multiple logic modules and includes output pathways to provide outputs from the plurality of stages to the multiple logic modules. In some embodiments the multiple of the clock period is either half of the clock period or one clock period. In some embodiments the multiple of the clock period is an integer multiple of half of the clock period. In some embodiments the transition is from an inactive state to an active state.

A further aspect of the disclosure provides a circuit including a system clock, a clock control block (CCB), a logic module (LM), an input configured to receive an instruction, the LM configured to send a clock request signal to the CCB in response to the received instruction, and the CCB including a plurality of CCB stages, each of the plurality of CCB stages outputting a single clock pulse in response to the receipt of the clock request signal and the system clock. In some embodiments the clock request signal includes a transition. In some embodiments each of the plurality of CCB stages outputs a single clock pulse having a clock transition dependant on the period of the system clock and the transition of the clock request signal. In some embodiments the transition of the clock request signal is a rising edge, a falling edge, a rising followed by a falling edge, or a falling edge followed by a rising edge. In some embodiments the LM includes a plurality of LM pipelines, and the LM is configured so that one stage of the LM pipeline receives a clock pulse output by the CCB every system clock period. In some embodiments the CCB is configures to receive the clock request signal in the form of a series of clock request and each of the plurality of CCB stages outputs an output series of single clock pulses, with the timing of the output series in response to the receipt of the system clock and the series of clock requests. In some embodiments the system clock has a first clock period having a first rising edge followed by a first falling edge followed by a second rising edge. The plurality of stages in this embodiment includes first, second and third stages configured such that the first CCB stage outputs a single clock pulse at the first rising edge, the second CCB stage outputs a single clock pulse at the first falling edge, and the third CCB stage outputs a single clock pulse at the second rising edge. In some embodiments each of the plurality of CCB stages outputs a single pulse at a multiple of the clock period. In some embodiments successive CCB stages of the plurality of CCB stages outputs a single pulse at successive edges of the system clock signal. In some embodiments the circuit further includes a second LM sending a second clock request to the CCB, and at least one CCB stage of the plurality of CCB stages outputs a single clock pulse dependant on the system clock and both the clock request and the second clock request. In some embodiments the system has a first clock period and the clock request signal is a clock request signal having a second clock period different than the first clock period. In some embodiments each of the plurality of CCB stages outputs a series of clock pulses having transitions dependant on the first clock period and the second clock period. In some embodiments the CCB is configured to receive clock requests from multiple LMs, and further includes output pathways to provide outputs from the plurality of stages to the multiple logic modules. In some embodiments the transition is from an inactive state to an active state.

BRIEF DESCRIPTION OF THE FIGURES

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
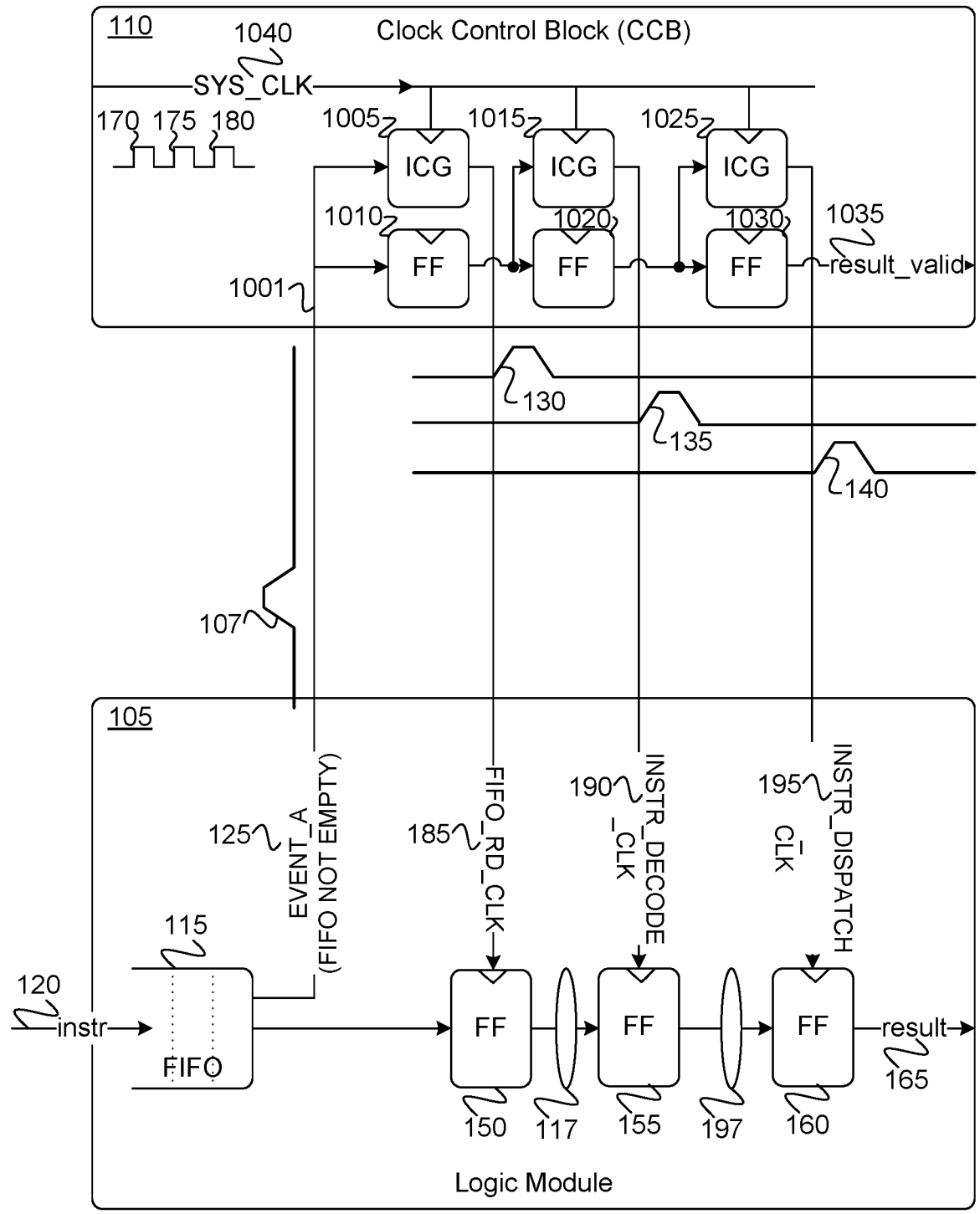
FIG. 1 is a block diagram illustrating an embodiment of a CCB, a pipeline in a logic module, and the communication between the CCB and the logic module's pipeline.

In the following description, features of the present invention are described by way of example embodiments.

On demand clock generation and clock propagation are two of the techniques used in asynchronous designs to reduce switching power, also known as the dynamic power, of the logic cells and cells in a clock-tree. Although these methodologies can reduce dynamic power in integrated circuits (ICs), they have not been adopted widely in industry due to the inability of IC design tools to easily accommodate them. In an asynchronous design, the on-demand clock-generation technique normally utilizes a custom pulse-generator which is triggered "on-demand" to generate one or more clock pulses. Triggering clocks only when needed minimizes dynamic power.

In conjunction with on-demand clock generation, propagated-clocks are sometimes used as a low-power design technique. In the propagated clocking technique, clock pulses are sent along with data. One of the main advantages of a propagated clock is that the length of the clock-tree can scale with the data-path delay. This may result in a shorter overall clock-tree, which may have less clock tree buffers, inverters, etc. that dissipate less power than a non-propagated clock tree.

However, these "asynchronous" low-power techniques are notoriously difficult for IC design tools to handle. This difficulty arises because correctly constraining asynchronous designs in the IC design tools is not a trivial task. IC design tools are designed for synchronous designs, and therefore, asynchronous designs must be constrained in IC design tools using synchronous constructs. As a result, the asynchronous design cycle using traditional design methodologies is much longer than the synchronous design cycle.

To reduce the design cycle time of asynchronous designs that use IC design tools, embodiments utilize a clock-gating enable signal which can be synchronously propagated as at least one clock pulse through a series of daisy-chained flip-flops rather than propagating a clock itself. This synchronous propagation of the clock-gating enable signal can be called "on-demand" clock generation.

Embodiments that support on-demand clock generation can be register-transfer level (RTL) designs which generate an "event clock request" signal to request generation of a clock signal. These clock requests can form a series of clock requests. Therefore, the request for generation of the event clock is transactional and acts to request the CCB supply clocking signals. The CCB includes a system clock, and an input configured to receive a clock request. The CCB also includes a plurality of stages, each of the plurality of stages outputting a single clock pulse dependent on the clock request and the system clock. Some embodiments use a transactional design, in which the CCB propagates the clock request signal as at least one clock pulse to a plurality of pipeline stages. Each stage receives the propagated clock pulse or clock pulses to clock flip-flops in a pipeline that require clocking in one or more logic modules. In some embodiments, not all of the stages require clocking, and accordingly flip-flops in stages which do not require clocking are not activated. The CCB is synchronous in that it propagates the clock request signal as one or more clock pulses synchronously with the CCBs internal clock. In other words, each CCB pipeline stage propagates the received clock request to the next stage based on the clock request and the system clock.

FIG. 1 illustrates embodiment 100 which includes a system clock, a Clock Control Block (CCB) 110, an Instruction Dispatch Logic Module (LM) 105, an input configured to receive an instruction 120, the LM configured to send a clock request signal to the CCB in response to the received instruction and the CCB including a plurality of CCB stages, each of the plurality of CCB stages outputting a single clock pulse dependant on the clock request signal and the system clock. Instruction Dispatch Logic Module 105 is shown receiving a new instruction 120 into its first-in-first-out (FIFO) 115. Reception of a new FIFO entry causes the FIFO 115 of the Instruction Dispatch Logic Module 105 to generate EVENT__A (FIFO NOT EMPTY) 125 which is transmitted to CCB 110 as clock request 107. Clock request 107 is generated when the reception of a new FIFO entry in FIFO 115 causes clock request 107 to transition from a logic low to a logic high. A transition from a logic low to a logic high is known by a person skilled in the art as a rising edge and a transition from a logic high to a logic low is known by a person skilled in the art as a falling edge. Clock request 107 can be either a rising edge, a falling edge, or a rising edge followed by falling edge, or a falling edge followed by a rising edge.

The CCB 110 includes an input 1001 configured to receive clock request signal 107. CCB 110's input 1001 is configured to receive clock requests from multiple logic modules and CCB 110 also has output pathways to provide outputs from the plurality of stages to multiple logic modules. The system clock of CCB 110 has a first clock period and the clock request 107 is a clock request having a second clock period different that the first clock period. CCB 110's plurality of output stages each output a single clock pulse where the period of each clock pulse depends on the period of the system clock, sys_clk 1040, and the transition of clock request 107. The plurality of output stages also outputs a series of clock pulses having transitions dependant on first clock period and the second clock period. Upon reception of clock request 107, by integrated clock gate (ICG) 1005 on the next rising edge 170 of SYS_CLK 1040, CCB 110 generates clock pulse 130. Instruction Dispatch Logic Module 105 (LM) includes a plurality of LM pipelines, and the LM is configured such that one stage of the LM pipeline receives a pulse output by the CCB every system clock period. Instruction Dispatch Logic Module 105 receives clock pulse 130 as FIFO_RD_CLK 185. CCB supplies clock pulse 130 to flip-flop 150, in one or more logic module pipeline stages, after ICG 1005 receives clock request 107. CCB 110 then generates two subsequent clock pulses, 135 and 140, which are received by Instruction Dispatch Logic Module 105 as INSTR_DECODE_CLK 190 and INSTR_DISPATCH_CLK 195. Instruction Dispatch Logic Module 105 uses INSTR_DECODE_CLK 190 and INSTR_DISPATCH_CLK 195 to perform subsequent decode and dispatch transactions when flip-flop 155 and flip-flop 160 are clocked. CCB 110 generates pulse 130 on the same SYS_CLK 1040 rising edge 170 that causes both flip-flop 1010 and ICG 1005 to capture clock request 107. Pulse 135 is transmitted by CCB 110 on the next rising edge 175 of SYS_CLK 1040 by clocking ICG 1015 and flip-flop 1020 to capture clock request 107 that was captured by flip-flop 1010 on the previous rising edge 170 of SYS_CLK 1040. Pulse 140 is transmitted by CCB 110 on the next rising edge 180 of SYS_CLK 1040 which clocks ICG 1025 and flip-flop 1030 to capture clock request 107 captured by flip-flop 1010 on SYS_CLK 210 rising edge 170 and by flip-flop 1020 on SYS_CLK 1040 rising edge 175. Rising edge 180 of SYS_CLK 1040 clocks flip-flop 1030 to generate result_valid 1035. Therefore, Instruction Dispatch Logic Module 105 performs three separate transactions based on a single event. Each transaction has its own clock pulse that is active when necessary. FIFO_RD_CLK 185 clocks flip-flop 150 to capture instruction 120 from FIFO 115, then INSTR_DECODE_CLK 190 clocks flip-flop 155 to capture instruction 120 after being processed by combinatorial logic 117. INSTR_DISPATCH_CLK 195 then clocks flip-flop 160 to capture the output of the next combinatorial logic processing stage 197. The transaction-based design methodology and the use of CCB 110 to generate clocks ensure that the clocks are active when required. Further, as data propagates through subsequent stages of transactions, the previous transactional stage clocks are inactive. Therefore, this embodiment minimizes dynamic switching power of the logic, sequential elements, and also of the clock tree.

Figure 2:
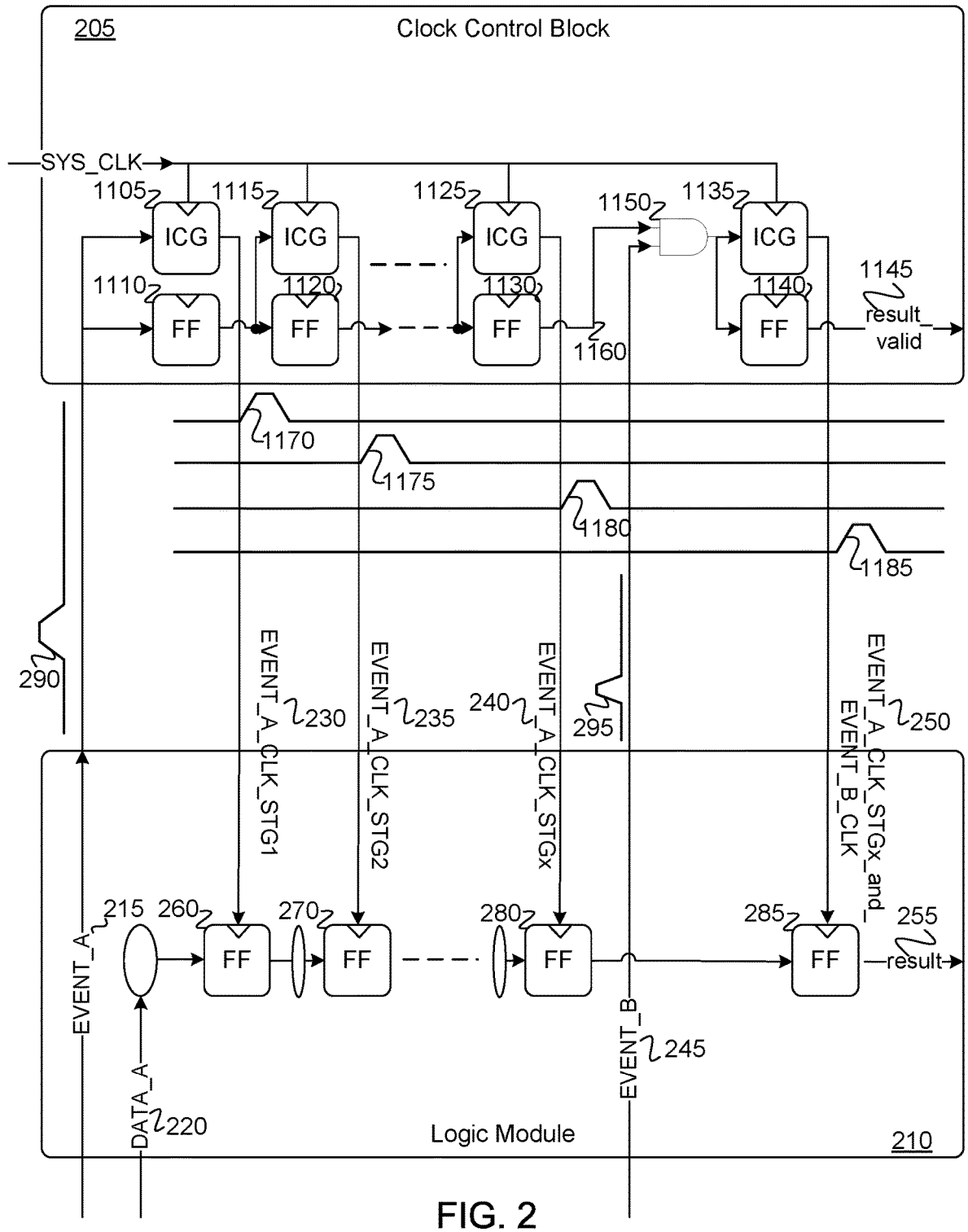
FIG. 2 is a block diagram illustrating an embodiment where CCB generates some clocking when triggered by a single event and some clocking when triggered by a combination of multiple events.

FIG. 2 illustrates an embodiment that generates its result when multiple clock requests are received by the CCB. The CCB in this embodiment has a second input for receiving a second clock request and generates a clock pulse dependant on the system clock, the clock request and the second clock request. In this embodiment, 200, EVENT__A 215 is a request to perform an on the input data DATA__A 220 and is received by CCB 205 as clock request 290. EVENT__B 245 is a second clock request and is received by CCB 205 as clock request 295. Reception of clock request 290 by an input of CCB 205 triggers generation of clock pulses 1170 (generated by ICG 1105), 1175 (generated by ICG 1115), and 1180 (generated by ICG 1125). Reception of clock requests 290 and 295 triggers the generation of clock pulse 1185. Logic module 210 receives clock pulse 1170 as EVENT_A_CLK_STG1 230, clock pulse 1175 as EVENT_A_CLK_STG2 235, clock pulse 1180 as EVENT_A_CLK_STGx 240, and clock pulse 1185 as EVENT_A_CLK_STGx_and_EVENT_B_CLK 250. Logic module 210 uses EVENT_A_CLK_STG1 230 to clock flip-flop 260, EVENT_A_CLK_STG2 to clock flip-flop 270, EVENT_A_CLK_STGx 240 to clock flip-flop 280, and EVENT_A_CLK_STGx_and_EVENT_B_CLK 250 to clock flip-flop 285. Clocking flip-flops 260, 270, 280, and 285 is required to generate result 255. CCB 205 generates clock pulse 1185, clocking flip-flop 285, when both the propagated clock request 290 is logic high and clock request 295 is logic high. Those skilled in the art will recognize that ICG 1135 generates clock pulse 1185 and flip-flop 1140 generates result valid 1145 when the output of AND gate 1150 is logic high and that AND gate 1150's output is logic high when both clock requests 290 (propagated through flip-flops 1110, 1120, and 1130) and clock request 295 are both logic high. It is important to note that, as was the case in embodiment 1, some of the clocks used by calculation unit logic module 210 are inactive once the result becomes available and calculation unit logic module 210 waits for the next event to trigger a subsequent transaction. Those skilled in the art will recognize that various combinations and permutations of events can be employed in transaction based designs to minimize clock toggling and also the switching power of the design.

In another embodiment, the time between supplied active edges of the clocking signal is increased so the clock pulses that clock a logic module's pipeline are only generated by the CCB as required by the pipeline's multi-cycle path. The time between active edges is known as the clocking cycle and can be increased in multiples of one CCB clock period when the CCB is configured to propagate the received enable on either the CCB clock's rising edge or falling edge. The gap can be the time when CCB clock is at a high clock level if the CCB is configured to propagate the received enable to the flip-flop launching the data on CCB clock's rising edge and to the flip-flop capturing the data on CCB clock's falling edge. The gap can also be the time when CCB clock is at a low clock level if the CCB is configured to propagate the received enable to the flip-flop launching the data on CCB clock's falling edge and to the flip-flop capturing the data on CCB clock's rising edge. Active edges can be the rising edge if the CCB is triggered by the rising edge of a clock, or the falling edge if the CCB is configured to propagate the received enable signal on the falling edge of the CCB clock, or the rising and falling edges if the CCB is configured to propagate the received enable signal on both the rising and falling edge of the CCB clock. Those skilled in the art will recognize that configuring the CCB to generate pulses on both the rising and falling edges of sys_clk allows the CCB to support half cycle clocking. For example, generating a pulse on the rising edge of sys_clk and a pulse on the falling edge of sys_clk and a pulse on the next rising edge of sys_clk clocks the logic module's pipeline flip-flops in half sys_clk clock cycles. CCB can be configured to insert delays in the form of multiple system clock periods between the clock pulses output by its plurality of stages. These multiple system clock periods are either half of the clock period or one clock period.

Figure 3:
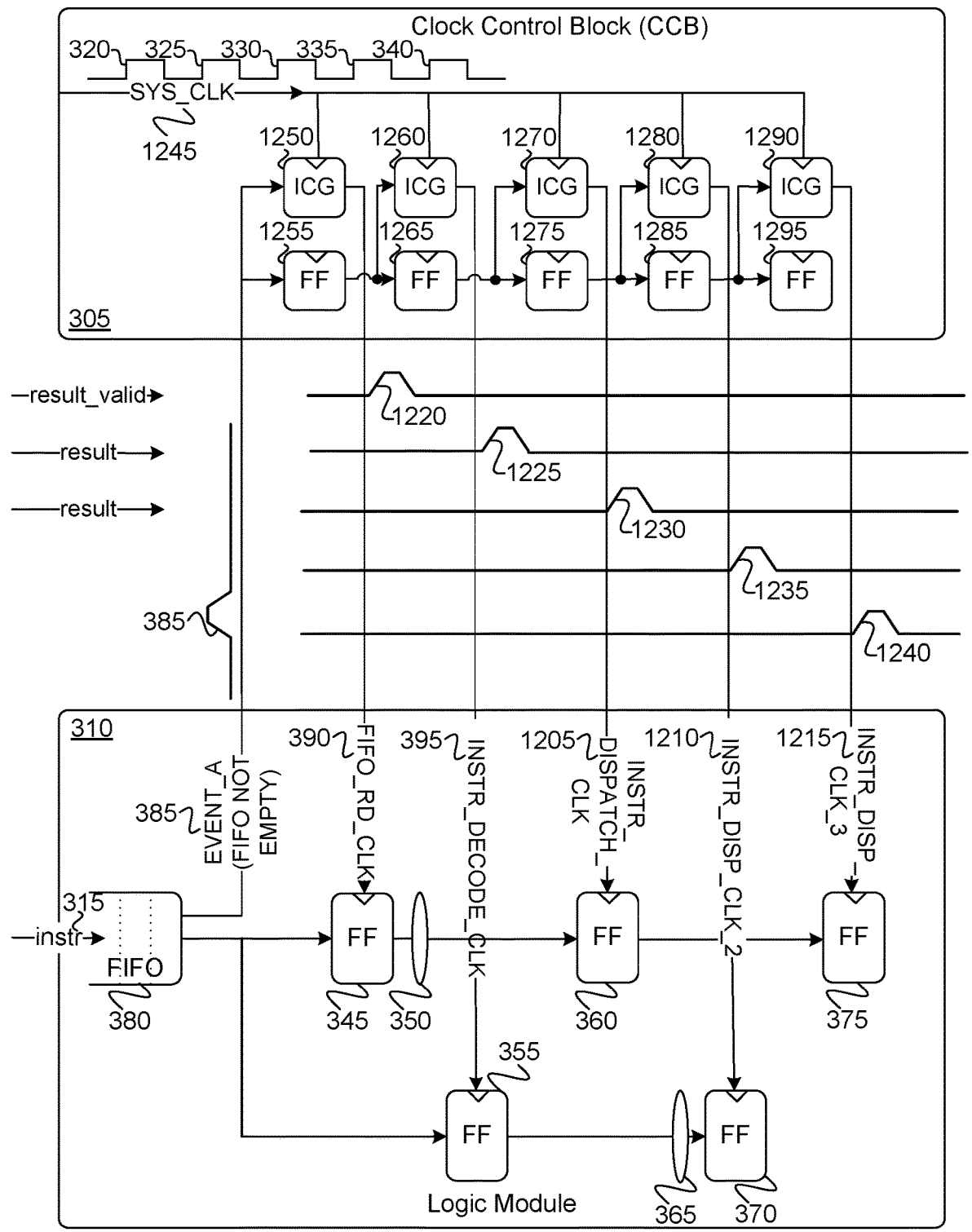
FIG. 3 is a block diagram illustrating an embodiment where the CCB increases the time between supplied active edges of the clocking signal. CCB increases the time between supplied active edges of the clocking signal so that some flip-flops in a pipeline are clocked by multicycle clocking.

FIG. 3 illustrates embodiment 300, which provides for gaps in the clocks that clock the logic module's pipeline. Instruction 315 is received by logic module 310's FIFO 380 and EVENT__A (FIFO NOT EMPTY) 385 is generated by logic module 310 and sent to an input (not shown) of CCB 305 as clock request 385. CCB 305 has a plurality of stages that outputs a series of single clock pulses. The system clock has a first clock period with a first rising edge followed by a first falling edge followed by a second rising edge. The plurality of stages includes a first, second, and third stages that are configured so that the first stage outputs a single clock pulse on the first rising edge of the system clock, the second stage outputs a single clock pulse on the first falling edge of the system clock, and the third stage outputs a single clock pulse on the second rising edge of the system clock. The plurality of stages outputs the single clock pulse at a multiple of the system clock period. In some embodiments, successive stages of the plurality of stages outputs a single pulse at successive sedges of the system clock. Clock request 385 enables ICG 1250 and flip-flop 1255. SYS_CLK 1245 rising edge 320 clocks ICG 1250 and flip-flop 1255 to generate clock pulse 1220, captured by Logic Module 310 as FIFO_RD_CLK 390, and also enables flip-flop 1265 and ICG 1260. SYS_CLK 1245's rising edge 325 clocks ICG 1260 and flip-flop 1265 to generate clock pulse 1225, captured by Logic Module 310 as INSTR_DECODE_CLK 395, and enabling flip-flop 1275 and ICG 1270. SYS_CLK 1245 rising edge 330 clocks ICG 1270 and flip-flop 1275 to generate clock pulse 1230, captured by Logic Module 310 as INSTR_DISPATCH_CLK 1205, and enabling flip-flop 1285 and ICG 1280. SYS_CLK 1245's rising edge 335 clocks ICG 1280 and flip-flop 1285 to generate clock pulse 1235, captured by Logic Module 310 as INSTR_DISP_CLK_2 1210 and enabling flip-flop 1295 and ICG 1290. SYS_CLK 1245's rising edge 340 clocks ICG 1290 and flip-flop 1295 to generate clock pulse 1240, captured by Logic Module 310 as INSTR_DISP_CLK_3 1215. FIG. 3 illustrates an embodiment provides for multi-cycle paths. Logic module 310's flip-flop 345 and 360 have a two clock cycle multi-cycle path and therefore, CCB 305 creates a gap in the clock that clocks flip-flop 360. CCB 305 clocks flip-flops 345 and 360 on SYS_CLK 1245's rising edge 320 and 330, not on SYS_CLK 1245's rising edge 325. Logic module 310's flip-flops 360 and 375 are also a two clock cycle multi-cycle path. Therefore, CCB 305 creates a gap in the clock that clocks flip-flops 360 and 375. The flip-flops in this pipeline stage, 345, 360, 375, therefore have a two clock cycle multi-cycle path and are not clocked every SYS_CLK 1245 clock cycle. This gap insertion reduces the dynamic power dissipated by logic module 310 by only clocking the flip-flops in this pipeline when needed and not every SYS_CLK 1245 clock cycle. Instruction 315 is read out of logic module 310's FIFO 380 on rising edge 320 of SYS_CLK 1245 when flip-flop 345 is clocked by clock pulse 1220createdby CCB 305. The captured version of instruction 315 by flip-flop 345 is then processed by combinatorial logic 350 and captured by flip-flop 360 when clocked by clock pulse 1230 created by CCB 305. As previously described, CCB 305 generates clock pulse 1240 on INSTR_DISP_CLK_3 1215 at SYS_CLK 1245's rising edge 340 causing logic module 310's flip-flop 375 to capture the output of flip-flop 360. The SYS_CLK 1245 rising edge 325, which is between SYS_CLK 1245 rising edges 320 and 330 is used by CCB 305 to generate clock pulse 1225 on INSTR_DECODE_CLK 395. Clock pulse 1225 on INSTR_DECODE_CLK 395 clocks logic module 310's flip-flop 355 to capture instruction 315 from logic module 310's FIFO 380. The SYS_CLK 1245 rising edge 335 occurring between SYS_CLK 1245's rising edge 330 that clocks flip-flop 360 and SYS_CLK 1245's rising edge 340 that clocks flip-flop 375 causes logic module 310's flip-flop 370 to capture the output of flip-flop 355 after being processed by combinatorial logic 365. Therefore logic module 310's flip-flops 355 and 370 also have a two clock cycle multi-cycle path and CCB 305 creates a gap in the clocks that clock flip-flops 355 and 370. This gap also reduces the dynamic power dissipated by logic module 310.

Figure 4:
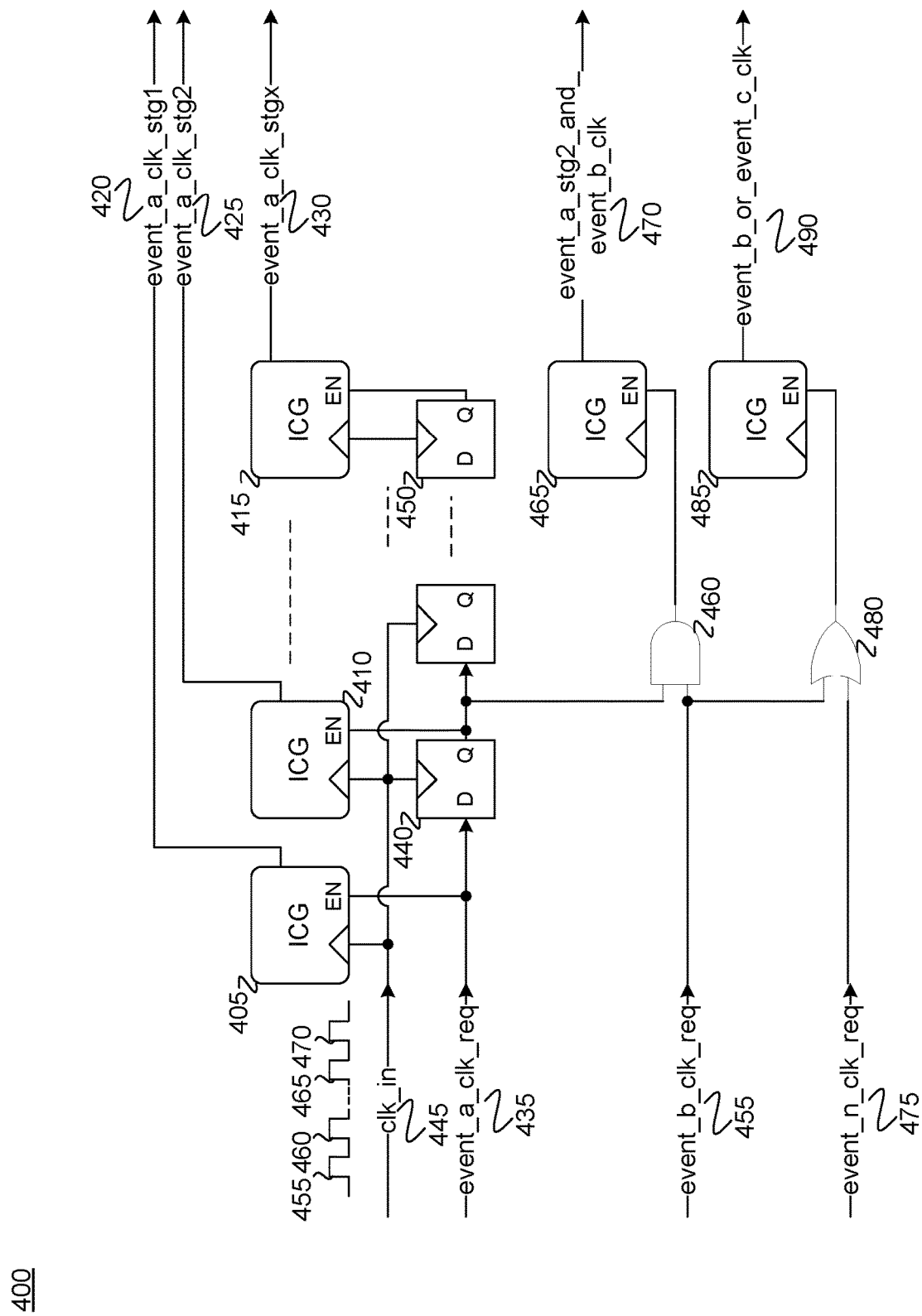
FIG. 4 is a block diagram illustrating an embodiment of a clock control block (CCB).

FIG. 4 illustrates CCB 400 according to an embodiment. CCB 400 uses n-stage clock-gating cells (ICGs) 405, 410, 415, located at the root of the clock tree, to generate "event clock" 420, 425, 430. Therefore, clock pulses are generated by CCB 400 on event_a_clk_stg1 420, event_a_clk_stg2 425, and event_a_clk_stgx 430 when requested and synchronous to its internal clock. This clocking can be a pulse with a width equal to one or more of the CCB's clock periods or, a clock with a period equal to the period of the enable signal received by the CCB. Also, propagation of the received enable signal by the CCB is triggered by the rising edge of the CCB's clock, falling edge of the CCB's clock, or by both the rising and falling edge of the CCB's clock. This on-demand clock generation results in less dynamic power dissipation than the dynamic power dissipated by traditional synchronous designs. An example of a clock request is when event_a_clk_req 435 is asserted to a high logic level, enabling ICG 405. When ICG 405 is enabled, the first rising edge 455 of clk_in 445 causes event_a_clk_stg1 420 to be set to logic high. This same rising edge 455 of clk_in 445 clocks flip-flop 440 capturing clock request event_a_clk_req 435 and enabling ICG 410. Event_a_clk_stg1 420 remains logic high until the rising edge of clk_in 445 clocks ICG 405 capturing event_a_clk_req 435 at a logic low. The second rising edge 460 of clk_in 445 clocks ICG 410 and causes event_a_clk_stg2 425 to be set to logic high. Again, event_a_clk_stg2 425 remains logic high until the rising edge of clk_in 445 clocks ICG 410 capturing event_a_clk_req 435, output by flip-flop 440, at a logic low. The n−1 rising edge 465 of clk_in 445 clocks flip-flop 450 capturing the output of the previous stage flip-flop (not shown), enabling ICG 415. The output of the previous stage flip-flop is the captured version of clock request event_a_clk_req 435. The nth rising edge 470 of clk_in 445 clocks ICG 415 and causes event_a_clk_stgx 430 to be set to logic high. As previously described, event_a_clk_stgx 430 remains logic high until the rising edge of clk_in 445 clocks ICG 415 capturing event_a_clk_req 435 at logic low. The logic state of Event_a_stg2_and_event_b_clk 470 is controlled by ICG 465. ICG 465 is enabled and Event_a_stg2_and_event_b_clk 470 is set logic high every rising clock edge when event_a_clk_req 435, captured by flip-flop 440, is ANDed by AND gate 460 with event_b_clk_req 455 and both the captured version of event_a_clk_req 435 and event_b_clk_req 455 are logic high. Event_a_stg2_and_event_b_clk 470 is set to a logic low when either flip-flop 440 captures event_a_clk_req 435 logic low, event_b_clk_req 455 is logic low, or both are logic low. The logic state of Event_b_or_event_c_clk 490 is controlled by ICG 485. ICG 485 is enabled when event_b_clk_req 455 ORed by OR gate 480 with event_n_clk_req 475 is logic high. Therefore, ICG 485 is enabled when event_n_clk_req 175, event_b_clk_req 455, or both, are logic high. Event_b_or_event_c_clk 490 is set to a logic low on the rising edge of the clock that clocks ICG 485 when event_b_clk_req 455 is logic low, event_n_clk_req 475 is logic low, or both are logic low.

Some embodiments also use logic blocks that are divided into transactional blocks with n pipeline stages. Each transaction block generates an "event clock request" when the transaction block detects an event which requires a transaction to be performed. The CCB generates a single event clock pulse followed by subsequent n-stage clocking signals are supplied to only one flip-flop in the logic module's pipeline stage per clocking cycle in the one or more logic modules that supplied the enable signal. The number of stages in the CCB that generate clock pulses can either be equal to the number of pipeline stages in the logic module or greater than the number of pipeline stages in the logic modules.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A circuit comprising:
   a system clock;
   a Clock Control Block (CCB);
   a Logic Module (LM);
   an input configured to receive an instruction;
   a second LM;
   the LM configured to send a clock request signal to the CCB in response to the received instruction; and
   the CCB including a plurality of CCB stages, each of the plurality of CCB stages outputting a single clock pulse in response to the receipt of the clock request signal and the system clock; and
   the second LM sending a second clock request to the CCB, and wherein at least one CCB stage of the plurality of CCB stages outputs a single clock pulse in response to the receipt of the system clock and both the clock request and the second clock request.

2. The circuit of claim 1 wherein the clock request signal includes a transition.

3. The circuit of claim 2 wherein each of the plurality of CCB stages outputs a single clock pulse having a clock transition dependant on the period of the system clock and the transition of the clock request signal.

4. The circuit of claim 3 wherein the transition of the clock request signal is one of:
   a rising edge;
   a falling edge;
   rising followed by a falling edge; and
   a falling edge followed by a rising edge.

5. The circuit of claim 1 wherein the LM includes a plurality of LM pipelines, and the LM is configured such that one stage of the LM pipeline receives a clock pulse output by the CCB every system clock period.

6. The circuit of claim 1 wherein:
   the CCB is configured to receive the clock request signal in the form of a series of clock requests;
   each of the plurality of CCB stages outputs an output series of single clock pulses, with the timing of the output series in response to the receipt of the system clock and the series of clock requests.

7. The circuit of claim 1 wherein the system clock has first clock period having a first rising edge followed by a first falling edge followed by a second rising edge, and the plurality of stages includes first, second and third stages configured such that:
   the first CCB stage outputs a single clock pulse at the first rising edge;
   the second CCB stage outputs a single clock pulse at the first falling edge; and
   the third CCB stage outputs a single clock pulse at the second rising edge.

8. The circuit of claim 1 wherein each of the plurality of CCB stages outputs a single pulse at a multiple of the system clock period.

9. The circuit of claim 1 wherein successive CCB stages of the plurality of CCB stages outputs a single pulse at successive edges of the system clock signal.

10. The circuit of claim 1 wherein:
    the system clock has first clock period; and
    the clock request signal is a clock request signal having a second clock period different than the first clock period.

11. The circuit of claim 10 wherein each of the plurality of CCB stages outputs a series of clock pulses having transitions dependant on first clock period and the second clock period.

12. The circuit of claim 1, wherein the CCB is configured to receive clock requests from multiple LMs, and further comprising output pathways to provide outputs from the plurality of stages to the multiple logic modules.

* * * * *